United States Patent
Ghisolfi et al.

(10) Patent No.: US 10,316,466 B2
(45) Date of Patent: Jun. 11, 2019

(54) PRETREATMENT PROCESS OF A LIGNO-CELLULOSIC FEEDSTOCK

(71) Applicant: Versalis S.p.A., San Donato Milanese (Milan) (IT)

(72) Inventors: Guido Ghisolfi; Ettore Bonaldi, Commugny (CH)

(73) Assignee: Versalis S.p.A., San Donato Milanese (IT)

( * ) Notice: Subject to any disclaimer, the term of this patent is extended or adjusted under 35 U.S.C. 154(b) by 0 days.

(21) Appl. No.: 15/548,425

(22) PCT Filed: Jan. 28, 2016

(86) PCT No.: PCT/EP2016/051775
§ 371 (c)(1),
(2) Date: Aug. 3, 2017

(87) PCT Pub. No.: WO2016/128221
PCT Pub. Date: Aug. 18, 2016

(65) Prior Publication Data
US 2018/0023249 A1    Jan. 25, 2018

(30) Foreign Application Priority Data
Feb. 9, 2015 (EP) .................................... 15425010

(51) Int. Cl.
| | |
|---|---|
| D21C 1/02 | (2006.01) |
| D21B 1/36 | (2006.01) |
| D21B 1/02 | (2006.01) |
| D21C 9/18 | (2006.01) |

(52) U.S. Cl.
CPC .............. *D21C 1/02* (2013.01); *D21B 1/02* (2013.01); *D21B 1/36* (2013.01); *D21C 9/18* (2013.01)

(58) Field of Classification Search
CPC .............................. D21C 1/00–10; D21B 1/36
See application file for complete search history.

(56) References Cited

U.S. PATENT DOCUMENTS

| | | |
|---|---|---|
| 5,476,572 A | 12/1995 | Prough |
| 5,622,598 A | 4/1997 | Prough |
| 5,635,025 A | 6/1997 | Bilodeau |
| 5,766,418 A | 6/1998 | Prough |
| 6,325,890 B1 | 12/2001 | Prough et al. |
| 7,600,960 B2 | 10/2009 | Christensen et al. |
| 8,328,947 B2 | 12/2012 | Anand et al. |
| 8,691,050 B2 | 4/2014 | Christensen |
| 2015/0191758 A1* | 7/2015 | Larsen .................... C12P 19/02 435/99 |
| 2016/0215448 A1* | 7/2016 | Dohrup .................... C10L 5/44 |

FOREIGN PATENT DOCUMENTS

| | | |
|---|---|---|
| WO | 2010/022511 A1 | 3/2010 |
| WO | 2010/058285 A2 | 5/2010 |
| WO | 2011/006244 A1 | 1/2011 |
| WO | 2013/098789 A1 | 7/2013 |

* cited by examiner

Primary Examiner — Anthony Calandra
(74) Attorney, Agent, or Firm — Edwin A. Sisson, Attorney at Law, LLC; Jeffrey J. Banyas

(57) ABSTRACT

It is disclosed a process to transfer a ligno-cellulosic feedstock from a low pressure zone to a high pressure zone. A slurry the ligno-cellulosic feedstock is first provided, which is then subjected to a multi-step liquid removal process comprising draining by gravity at least a portion of the free liquid; removing a first portion of the capillary liquid in a low pressure zone by continuously compressing a stream of the ligno-cellulosic feedstock to reach a moisture content in a first target range; removing a second portion of the capillary liquid by shearing and compressing the ligno-cellulosic stream in a plug forming device, to form a ligno-cellulosic feedstock plug having a moisture content in a second target range at an outlet of the plug forming device connected to the high pressure zone. In the removal of the first portion of the capillary liquid, at least one first compression device continuously compresses the stream of the drained ligno-cellulosic feedstock to a first control pressure, while conveying the stream of the drained ligno-cellulosic feedstock in a flow direction of a belt filter press.

19 Claims, No Drawings

PRETREATMENT PROCESS OF A LIGNO-CELLULOSIC FEEDSTOCK

PRIORITIES AND CROSS REFERENCES

This Application claims priority from International Application No. PCT/EP2016/051775 filed on 28 Jan. 2016 and European Application No. 15425010.4 filed on 9 Feb. 2015, the teachings of each of which are incorporated by reference herein in their entirety.

BACKGROUND

Ligno-cellulosic feedstocks may be converted to useful compounds, such as biofuels and bio-chemicals, but a pre-treatment is usually required to break up the ligno-cellulosic structure in order increase the accessibility to the carbohydrates therein contained. Many hydrothermal pretreatments have been developed so far, which treat the feedstock in the presence of liquid water or steam, all occurring in a pressurized environment. Pressure is usually attained by means of water or steam injection. Steam explosion is a widely used pretreatment, wherein steam pressure is rapidly release to cause the explosive disruption of the ligno-cellulosic structure.

Therefore, the feedstock, received dry in the conversion plant, must be transferred from atmospheric pressure to the process pressure. As the conversion process in industrial is typically conducted in a continuous way, a feedstock stream must enter a pressurized zone, while preventing catastrophic pressure losses which could perturb pressure conditions, stopping the plant operation, and cause serious injuries to operators. The pressurized zone may be the pressurized pretreatment reactor or a pressurized zone upstream of the pretreatment reactor. While different solutions have been implemented to transfer continuously the feedstock to a pressurized reactor on a pilot scale, on industrial scale stable continuous transfer is still a serious issue, as the feedstock must be transferred at very high mass flows, with typical of many tens, or hundreds, of metric tons per hours.

Another problem arises in transferring comminuted low density biomasses, such as straw feedstock, on industrial scale. Due to the low density of the feedstock, transferring a high mass flow means to handle an astonishing volume flow, in terms of cubic meters per hour. The problem becomes critical in the case that a volumetric device, such as a biomass compressor, is used to transfer the light feedstock to the pressurized section of the plant. In these conditions, the volumetric device represents a bottleneck in the transferring rate.

Different strategies have been developed so far for transferring a feedstock stream between zones at increasing pressures.

According to a first strategy, the continuous feedstock stream is partitioned in aliquots, each aliquot being sequentially transferred to the high pressure zone maintaining the two zones isolated.

As an example, U.S. Pat. No. 7,600,960 discloses a method based on sluice system, according to which the product is first conveyed through a portioning device, which produces a sequence of uniform product portions divided by uniform particle free spaces, and subsequently the product portions are conveyed individually through a sluice device. The device comprises at least one sluice chamber and two pressure locks of which at least one at any time secures a pressure tight barrier between the two pressure zones, and the product portions are force loaded from the first zone into a sluice chamber by means of a piston screw, the axis of which is practically in line with the axis of the sluice chamber, and the product portions are force unloaded from the sluice chamber and into the second pressure zone by means of said piston screw or a piston or by means of gas, steam or liquid supplied at a pressure higher than that of the second pressure zone.

The method of U.S. Pat. No. 7,600,960 is intrinsically complex, requiring a long sequence of operations to transfer a small portion of the feedstock, thereby limiting the feedstock transfer rate. Moreover, the pressure locks are subjected to failure on long operating time, and may be obstructed especially when the transfer is operated at high rate.

According to a second strategy for transferring a feedstock stream to a high pressure zone, the feedstock is first mixed with water or other liquid to form a diluted slurry, which is more easily conveyed through the different steps of the pre-treatment process under pressure. Thereby, the feedstock is transferred from the low pressure zone to the high pressure zone in a slurry form. The addition of water facilitates the transportation and mechanical handling of the lignocellulosic feedstock in unit operations upstream of and within the pretreatment reactor.

The slurry of lignocellulosic feedstock may be pressurized above the pressure in the high pressure zone using a series of specially engineered pumps.

In some cases, the diluted feedstock slurry is pumped by means of a slurry pump to an intermediate pressure and fed to a high pressure feeding device, which may be a rotary transfer device or a plug forming device, for being transferred to the high pressure zone. Examples of these solutions, specifically for a wood chips feedstock used in the pulp and paper industry, are disclosed in U.S. Pat. Nos. 5,476,572, 5,622,598 and 5,635,025 and 5,766,418. As described in these patents, using a slurry pump to feed a slurry to a high-pressure transfer device dramatically reduces the complexity and physical size of the system needed, and increases the ease of operability and maintainability.

U.S. Pat. No. 6,325,890 disclosed a system and method for feeding comminuted cellulosic fibrous material such as wood chips to the top of a treatment vessel such as a continuous digester. The disclosed method and system provide enhanced simplicity, operability, and maintainability by eliminating the high pressure transfer device used in U.S. Pat. Nos. 5,476,572, 5,622,598 and 5,635,025 and 5,766,418. Instead of a high pressure transfer device the steamed and slurried chips are pressurized using one or more slurry pumps located at least thirty feet below the top of the treatment vessel and for pressurizing the slurry to a pressure of at least about 10 bar gauge.

U.S. Pat. No. 6,325,890 thereby disclosed a method to transfer a slurry of comminuted cellulosic fibrous material directly to a digester by using a high-pressure slurry pump.

The mentioned solutions for transferring a feedstock in slurry form suffers of many drawbacks. First, the feedstock slurry is diluted and the mass of liquid present is usually at least 5 to 25 times the mass of feedstock solids present for the slurry to flow uniformly. This implies that an impressive amount of liquids should be managed on industrial scale, which can easily reach the flow rate of thousand metric tons per hour. As this may not be a serious problem at atmospheric pressure, it becomes unreasonable to pressurize and pump such flow rate by means of high pressure slurry pumps. Second, the high pressure zone is typically pressurized by steam injection at high temperature to heat up the feedstock. The amount of steam needed for this heat-up is a direct function of the total mass of the slurry, including the water addition for transportation of the slurry. Thus, the presence of a large amount of water requires a large amount of steam for the heat-up.

According to a third strategy for transferring a feedstock stream to a high pressure zone, the feedstock is transferred to the high pressure zone by means of plug forming device connected to, such as a screw press, a screw feeder, a compressor, an extruder and similar device. The feedstock is treated to reach a suitable moisture content and then inserted into the plug forming device, wherein it is advanced and continuously compressed to form a feedstock plug at outlet of the plug forming device connected to the high pressure zone. At the same time, liquids are removed from the feedstock due to mechanical actions in the plug forming device. The feedstock plug is in principle able to dynamically seal the high pressure zone preventing steam losses, but it fails to work at high flow rate on industrial scale due to frequent plug inhomogeneity. The main drawback of this solution is the fact that the sealing plug usually fails to work continuously, and plug losses are extremely frequent. Moreover, the plug loss frequency is increased at high flow rate. Another problem is represented by the high energy consumption of such device for compressing the feedstock, which also implies to dissipate the heat generated. A further problem is the efficient removal of liquids from the plug forming device, for preventing the accumulation of incompressible fluids.

U.S. Pat. No. 8,691,050 discloses methods and devices for continuously transferring particulate material into pressurized steam reactors by "flow feeder". Material such as lignocellulosic biomass feedstocks are compacted into a "low density" plug, <700 kg/m3, which provides a dynamic seal against pressurized steam through exploitation of a steam condensation zone. The rate at which the steam condensation zone moves into the "low density" plug is offset by the rate at which compacted material is fed into the pressurized reactor. Preferred devices compact material within a flow feeder chamber by use of a loading device that works against counter-pressure provided by an unloading device. Compacted material is actively disintegrated and fed into the reactor by the unloading device. In preferred embodiments, compacted material is fed in a steady-state operation in which the interface between the steam condensation zone and the low pressure inlet zone remains stationary within the flow feeder chamber. Even if the solution disclosed in U.S. Pat. No. 8,691,050 reduces the energy required to form the plug, it fails to work in real applications, as a perfect steady state is impossible to be maintained over a long time and plug losses are increased.

U.S. Pat. No. 8,328,947 discloses a method for hydrolyzing polysaccharides in a lignocellulosic feedstock to produce monosaccharides or pretreating a lignocellulosic feedstock, in which an aqueous slurry of the lignocellulosic feedstock is fed into a pressurized dewatering zone wherein the feedstock is partially dewatered and then is compressed into a plug. The plug provides a pressure seal between the outlet of the dewatering zone and the reaction zone.

In U.S. Pat. No. 8,328,947 a method is provided for hydrolyzing polysaccharides in a lignocellulosic feedstock to produce monosaccharides or pretreating a lignocellulosic feedstock, in which an aqueous slurry of the lignocellulosic feedstock is fed into a pressurized dewatering zone by means of a high pressure slurry pump, wherein the feedstock is partially dewatered. The dewatering zone includes one or more devices to remove water under pressure from the aqueous feedstock slurry. Dewatering devices suitable for use in the invention include pressurized screw presses, as described in more detail hereinafter, and pressurized filters. The partially dewatered lignocellulosic feedstock stream from the outlet zone of the dewatering zone is moved to the inlet zone of a plug formation zone. In such zone, the partially dewatered lignocellulosic feedstock stream forms a plug that functions as a continuous pressure seal between the outlet zone of the dewatering zone and the inlet zone of the reaction zone. The plug is introduced into a reaction zone that operates at a pressure (Pr) equal to greater than about 90 psia and under suitable temperature and pH conditions to hydrolyze the polysaccharides or pretreat the feedstock. The plug provides a pressure seal between the outlet of the dewatering zone and the reaction zone. The pressure of the aqueous slurry of the lignocellulosic feedstock at the inlet of the dewatering device is related to Pr by different mathematical formulas indicated in the patent, all meaning that the pressure of the aqueous slurry is increased by the high pressure slurry pump from a starting pressure to an intermediate pressure which is closer to Pr, thereby reducing the pressure difference that the feedstock plug must continuously withstand.

The method disclosed in U.S. Pat. No. 8,328,947 presents the already mentioned drawback of pumping a diluted slurry at high flow rate with a high pressure slurry pump. Moreover, removing such at high flow rate from the pressurized dewatering zone may become an important issue.

In pretreating a lignocellulosic feedstock on industrial scale, there exist many problems related to the transferring of the feedstock in slurry form which are not solved in the prior art.

One first problem to be solved is to prevent the feedstock to plug into pressurized transferring conduits, such as pressurized pipes, particularly in the case of comminuted straw.

Another problem is the processing of a large amount of slurried ligno-cellulosic feedstock, which implies dewatering and removing a large amount of liquid in a short time. Namely, on an industrial scale, many tens, or hundreds, of tons of biomass are processed per hour and there is the need to prevent the accumulation of the removed liquid from the slurry in the dewatering devices, as the accumulation of incompressible fluids will render dewatering ineffective.

One solution to this problem is to use parallel transferring systems and devices as described in U.S. Pat. No. 8,328,947, but this simple solution increases costs. Moreover it would introduce complexity, as it would imply to manage multiple interfaces between zones at different pressure, thereby increasing the risk of frequent failure in pressurization of the high pressure zone.

Another problem to be solved is the energy needed to dewatering the slurry on industrial scale. On one hand, there is the need to reduce energy consumption for cost reasons, on the other hand if a great power is dissipated in the dewatering device, temperature would rise significantly increasing the risk of machinery failures.

A further problem is related to the transferring of a lignocellulosic slurry wherein the feedstock is a straw, such as wheat straw. Straw feedstock has typically a very low moisture content; when slurried, it adsorbs a large amount of water before free liquid appears. This adsorbed water or liquid, which is a capillary liquid is then difficult to be removed, as it is required for forming a feedstock plug capable of a sealing process zones at different pressure.

None of the above described problems arising in pretreating a ligno-cellulosic feedstock by a pretreatment process involving the transferring a ligno-cellulosic feedstock between zones at different pressures, particularly a straw feedstock, are solved by the prior art, particularly in the case of a high flow rate as required by an industrial application.

SUMMARY OF INVENTION

According to one aspect of the invention, it is disclosed a continuous process to transfer a ligno-cellulosic feedstock from a low pressure zone to a high pressure zone. The ligno-cellulosic feedstock is introduced into the high pressure zone, by means of a plug forming device, which receives the ligno-cellulosic feedstock from an inlet connected to the low pressure zone, removes liquids from the ligno-cellulosic feedstock by imparting shear and compression forces, while advancing the ligno-cellulosic feedstock through an internal chamber to form a feedstock plug at an outlet of the plug forming device connected to the high pressure zone. The feedstock plug is capable of continuously preserve the difference of pressure between the low pressure zone and the high pressure zone, provided that the moisture content of the feedstock of the feedstock plug is in a specific target range.

Inventors have found that the ligno-cellulosic feedstock continuously entering the plug forming device must have a moisture content in a narrow target range. Namely, in the case that the moisture content is too high, the plug forming device would remove a relevant amount of liquid, which is incompressible, from the ligno-cellulosic feedstock and it would be difficult to withdrawn it from the internal chamber of the plug forming device. On the other hand, in the case that the moisture content of the ligno-cellulosic feedstock entering the plug forming device is too low, the feedstock plug would not be able to preserve the difference of pressure between the low pressure zone and the high pressure zone.

As the feedstock is introduced continuously in the plug forming device, thereby in the form of a stream, inventors have also found that it is necessary that the moisture content of an aliquot of the ligno-cellulosic feedstock entering the plug forming device is in a narrow target range, wherein the aliquot has a volume which is comparable to the volume of the internal chamber of the plug forming device.

Inventors have discovered that, in order to reach this stringent requirement, the ligno-cellulosic feedstock must be provided in a slurry form, in such a way that the moisture content of the ligno-cellulosic feedstock in the slurry is greater than the narrow moisture content target range of the feedstock entering the plug forming device. The feedstock slurry is then dewatered by removing progressively liquids in a multi-step dewatering process. First, at least a relevant portion of the free liquid is drained by gravity to create a drained ligno-cellulosic feedstock comprising a capillary liquid, which is the liquid which is not present as a free liquid. Then a first portion of the capillary liquid is removed by compression. Being the first portion of capillary liquid easy to be removed, a great amount of liquid is removed in this compression step, which is performed in a low pressure zone, the low pressure zone being preferably at atmospheric pressure. A second portion of the capillary liquid, which is more difficult to be removed, is then removed by the plug forming device by imparting shear and compression forces.

Inventors have also found that the step of removing the first portion of capillary liquid can be performed conveniently by continuously compressing a stream of the ligno-cellulosic feedstock at a compression rate which is in a in specific range, thereby the compression is actuated not on the feedstock as a whole, but on aliquots of the feedstock. The feedstock stream entering the compression step may vary over time, because the flow rate is time-variable, or because the moisture content is time-variable, or not uniform. In these cases, the compression rate may vary over time in the range of the compression rate, in order to reach a uniform moisture content of the ligno-cellulosic feedstock entering the plug forming device. Inventors have discovered that by continuously compressing the ligno-cellulosic feedstock to at least one control pressure, the homogeneity of the moisture content of the ligno-cellulosic feedstock entering the plug forming device is greatly improved, and this feature increases the stability of the feedstock plug at the outlet of the plug forming device.

A preferred way to perform the continuous compression step to at least one control pressure is to use a belt filter press, wherein the compression to at least one control pressure is actuated while conveying the stream of the ligno-cellulosic feedstock in a flow direction of the belt filter press. As known in the art, in a belt filter press, two endless belts are coupled to define a compression region. The control pressure may be accomplished by means of suitable compression devices, such as pistons or springs, acting on at least one belt of the belt filter press. The compression devices force the belt to move up and down at at least one position along the flow direction, until the control pressure is exerted. Preferably, there are more compression devices distributed along the flow direction, each having a specific control pressure, and the control pressure of the compression devices more preferably increases along the flow direction. Thereby, the preferred way to continuously compress the ligno-cellulosic feedstock to remove the first portion of capillary liquid is a belt filter press having a variable profile of the compression region. In this way, the moisture content of the stream of the ligno-cellulosic feedstock is progressively equalized to reach a uniform moisture content before entering the plug forming device.

Therefore, according to another aspect of the invention, it is disclosed a process to progressively remove liquids from a slurry of a ligno-cellulosic biomass, wherein the liquid removal is distributed in different zones. The distributed liquid removal can remove a great amount of total liquids in a short time, preventing liquid accumulation, as required in industrial applications.

According to another aspect of the invention, different processes to provide a slurry of the ligno-cellulosic feedstock are also disclosed. The slurry of the ligno-cellulosic feedstock may be then transferred a high pressure zone according to the disclosed transferring processes.

In a first process to provide the slurry of the ligno-cellulosic feedstock, the lignocellulosic feedstock, which has a starting liquid retention capability, is subjected to a soaking step in a soaking liquid comprising water to provide a slurry of the ligno-cellulosic feedstock comprising a free liquid and the soaked ligno-cellulosic feedstock. The liquid retention capability describes the capability of the feedstock to retain a capillary liquid. The liquid retention capability is the maximum percent moisture content by weight of the ligno-cellulosic feedstock after all the free liquid is drained by gravity from the slurry. Preferably, the soaking step is conducted for a time sufficient to raise the moisture content of the ligno-cellulosic to or close to the starting liquid retention capability. In a preferred embodiment, the soaking step is conducted in a continuous way and the soaking liquid further comprises water soluble compounds, such as for instance dissolved salts and acids, or waxes, which are derived from a non-ligno-cellulosic component of the ligno-cellulosic feedstock and solubilized in the soaking step. In another preferred embodiment, external contaminants, such as stones or metal objects, are separated from the ligno-cellulosic feedstock during the soaking step.

Inventors have also discovered that the starting liquid retention capability of the ligno-cellulosic feedstock may be raised by means of a mild hydrothermal treatment. Thereby, in a second process to provide the slurry of the ligno-cellulosic feedstock, the ligno-cellulosic feedstock is subjected to a treatment in a treatment liquid comprising water to at a temperature between 60° C. and 160° C., and for a time sufficient to increase the starting liquid retention capability. By increasing the liquid retention capability of the ligno-cellulosic feedstock, the downstream dewatering process may be improved, in terms of better homogeneity of the moisture content in the stream of the ligno-cellulosic feedstock entering the plug forming device. Optionally, the mild hydrothermal treatment may be preceded by the disclosed soaking process to raise the moisture content of the ligno-cellulosic to or close to the starting liquid retention.

According to another aspect of the invention, it is disclosed a process to pretreat a ligno-cellulosic biomass, the process being operated continuously at a high flow rate as required by industrial applications, wherein the ligno-cellulosic feedstock is first provided in a slurry form comprising a free liquid and a ligno-cellulosic feedstock comprising a capillary liquid. The slurry may be provided by means of a process comprising the disclosed soaking step to raise the moisture content of ligno-cellulosic feedstock without significantly modifying the starting liquid retention capability, or the disclosed mild hydrothermal step to increase the starting liquid retention capability, or both the process steps. The lignocellulosic feedstock is then transferred to a high pressure reactor by means of the disclosed transferring process, wherein the free liquid and capillary liquid are progressively removed by means of a sequence of draining by gravity, compression and compression and shear. In the high pressure reactor, the ligno-cellulosic feedstock is subjected to a hydrothermal treatment at a temperature in the range of 160° C. to 250° C., corresponding to a high severity treatment, to produce a pretreated lignocellulosic feedstock, which is then preferably steam exploded by rapidly releasing the pressure applied to the feedstock in the high pressure reactor.

The disclosed pretreatment process prevents the feedstock to clog equipments, for example in transferring devices, and at the same reduces the risk of dangerous pressure losses from the pressurized reactor during the transferring of the feedstock to the pressurized reactor. These problems arise in particular in the case of a straw feedstock, which is therefore a preferred feedstock.

In the pressurized reactor, the ligno-cellulosic feedstock is subjected to a hydrothermal treatment at high pressure in the presence of water in liquid or steam phase, or a combination thereof. Preferably the ligno-cellulosic feedstock is further subjected to steam explosion by rapidly releasing the pressure applied to the feedstock.

DETAILED DESCRIPTION

The disclosed process is a process for pretreating a ligno-cellulosic feedstock. Preferably the size of the ligno-cellulosic feedstock has been reduced, for instance by cutting, chopping or other means, and it enters the disclosed process as comminuted ligno-cellulosic feedstock.

A description of a ligno-cellulosic feedstock may be found in WO2013098789, pag. 5-10. Even if the disclosed process may be used to any kind of ligno-cellulosic feedstock, it is suitable in particular in the case of a straw feedstock, such as wheat straw. It is known in the art that a comminuted straw feedstock forms a sticky slurry which presents many handling issues, such as clogging up pipelines, when it is conveyed or compressed. Moreover, these handling issues are enhanced in the case that the feedstock is processed at a high flow rate, which is the most interesting practical application.

Thereby, a preferred ligno-cellulosic feedstock is straw, preferably wheat straw, rice straw, or barley straw. Bagasse is another preferred feedstock, in particular sugar cane bagasse.

The disclosed process is a continuous process. In order for a process to be continuous, it is not necessary that the ligno-cellulosic biomass stream is continuously introduced into the process, but it can be introduced at steady aliquots or pulses. Thus there are moments when there may be no ligno-cellulosic feedstock entering the process. But, over time, the total mass introduced into the process equals the total mass removed from the process. One distinguishing feature between a continuous and a batch process is that, in a continuous process, the process is occurring or progressing at the same time that either the ligno-cellulosic feedstock is introduced into the process and/or it is removed from the process. Another way to state this is that the process occurs while simultaneously, or at the same time, removing the ligno-cellulosic feedstock. Such removal is done in a continuous manner which includes an aliquot or pulse removal.

The ligno-cellulosic feedstock, as typically received in a conversion plant, is typically a dry feedstock. The moisture content in this case is preferably less than 50%, more preferably less than 30%, even more preferably less than 20%, and most preferably less than 10%.

The ligno-cellulosic feedstock has a starting liquid retention capability, which can be measured by slurrying the feedstock with an excess of water, preferably under agitation to create a homogeneous slurry comprising a free liquid, at atmospheric pressure and 25° C. for a time sufficient to saturate the ligno-cellulosic feedstock with water. For instance, slurry can be held for 1 hour. The free liquid is then separated by decantation from the ligno-cellulosic biomass soaked with water, which therefore retains the maximum amount of water which is not free water. The liquid retention capability is the percent amount of water by weight on a wet basis after all the free liquid is drained by gravity. Liquid retention capability expressed as the weight percent water of the lignocellulosic feedstock after removal of the free liquid may vary in wide ranges, depending on the kind of feedstock; for instance, it may be from 50% to 90%, or from 60% to 90%, or from 65% to 80%, or from 70% to 75% by weight on a wet basis.

The first step of the disclosed process is to provide a slurry of the ligno-cellulosic feedstock.

In a first preferred embodiment to provide the slurry of the ligno-cellulosic feedstock, the ligno-cellulosic feedstock is soaked in a soaking liquid comprising water a soaking temperature between 30° C. and 100° C.

The soaking temperature may be from 40° C. to 99° C., preferably from 40° C. to 90° C., and most preferably from 50° C. to 85° C.

The soaking time, which is a residence time in a soaking vessel or series of soaking vessels in the case of a continuous process, is selected to increase the moisture content of the ligno-cellulosic feedstock to at least 80% of the starting liquid retention capability, preferably at least 90% of the starting liquid retention capability, and most preferably 95% of the of the starting liquid retention capability. Soaking time may be from 30 seconds to 300 minutes, preferably from 1 minute to 20 minutes, more preferably from 2 minutes to 20 minutes, even more preferably from 2 minutes to 15 minutes, even yet more preferably from 3 to 10 minutes, and most preferably from 1 to 3 minutes. The soaking time is conducted in condition which does not alter the liquid retention capability of the ligno-cellulosic feedstock.

Apart from carbohydrates (mainly glucans and xylans) and lignin, the ligno-cellulosic feedstock comprises non-ligno-cellulosic water soluble compounds. The non-ligno-cellulosic water soluble compounds comprise compounds different from carbohydrates and which are naturally present in the ligno-cellulosic biomass, including, among others: organic and inorganic salts of cations and anions including sodium, calcium, potassium, ammonium, magnesium; waxes and extractives in general. In a preferred embodiment at least a portion of these compounds are solubilized in the slurry liquid, as they may create many problems in downstream process steps.

A small amount of the carbohydrates of the ligno-cellulosic component may be solubilized to soluble sugars in the slurry liquid, depending on soaking temperature and soaking time Preferably, the soaking conditions are such that the most portion of the water soluble compounds are solubilized in the extraction water while no significant solubilization of the carbohydrates occurs.

The soaking step is preferably conducted in continuous way in a vessel, series of vessels, or pool or series of pools, at atmospheric pressure. The ligno-cellulosic feedstock may be introduced into the soaking vessel, continuously or in aliquot, at an inlet of the soaking vessel, and it may conveyed to an outlet of the soaking vessel by means of conveying means preferably under agitation to promote the soaking of the feedstock.

The soaking step is preferably conducted in great excess of liquid with respect to the amount of ligno-cellulosic feedstock present in the soaking vessel. The amount of liquid in the soaking vessel may be controlled by regulating the flows of streams entering and exiting the separation vessel.

The soaking step thereby provide a slurry of the ligno-cellulosic feedstock, comprising a free liquid and a soaked ligno-cellulosic biomass.

In another preferred embodiment to provide the slurry of the ligno-cellulosic feedstock, the ligno-cellulosic feedstock is subjected to a treatment in the presence of water at a temperature between 60° C. and 160° C. The water may be present in liquid or steam phase. The water may be present into the reactor or added to the reactor as steam or liquid. In one embodiment, steam is added to the ligno-cellulosic feedstock before or while the ligno-cellulosic feedstock enters the treatment reactor. In another embodiment, water is added to the treatment reactor. The disclosed treatment is conducted for a time sufficient to create a slurry comprising a free liquid and a treated ligno-cellulosic feedstock, wherein the treated ligno-cellulosic feedstock has a liquid retention capability which is greater than the starting liquid retention capability. The liquid retention capability of the treated ligno-cellulosic feedstock may be at least 5% greater than the starting liquid retention capability, preferably at least 10% greater than the starting liquid retention capability, and most preferably at least 20% greater than the starting liquid retention capability. This percent increase in retention capability is determined by dividing the increased liquid retention capability by the starting liquid retention capability subtracting 1 and multiplying 100 to achieve the percent increase in the liquid retention capability. The liquid retention capability of the treated ligno-cellulosic feedstock may be from 50% to 99%, or from 60% to 95%, or from 65% to 95%, or from 80% to 85% by weight on a wet basis. Treatment time may be from 5 minutes to 3 hours, preferably from 10 minutes to 2 hours, and most preferably from 30 minutes to 1 hour. Thereby, the disclosed treatment is a hydrothermal treatment operated in mild conditions. A certain degree of solubilization of the carbohydrates may occur during the treatment, but it is preferably low. The percent amount of carbohydrates solubilized in the thermal treatment may be less 10%, preferably less than 5%, more preferably less than 3%, even more preferably less than 2% and most preferably less than 1% by weight of the carbohydrates of the ligno-cellulosic feedstock entering the mild hydrothermal treatment.

The mild hydrothermal treatment is preferably conducted in a reactor vessel which may be at atmospheric pressure or in pressurized conditions. In one embodiment, the treatment temperature is less than 100° C. and the reactor vessel is at atmospheric pressure. In another embodiment, the treatment temperature is greater than 100° C. and the reactor pressure is at a pressure greater than 100 kPa. The reactor pressure may be defined by the saturated steam equilibrium condition. The reactor pressure may be less than 600 kPa, preferably less than 400 kPa, and most preferably less than 200 kPa. In a further embodiment, the reactor pressure is greater than 100 kPa even if the treatment temperature is less than 100° C., preferably greater than 80° C., as may occur due to fluid dynamical effects in particular operating modes of the reactor.

The mild hydrothermal treatment may be preceded by the previously disclosed soaking process. In this embodiment preferably at least a portion of the slurry liquid of the slurry produced in the soaking step are separated from the soaked lignocellulosic feedstock, which is then subjected to the mild hydrothermal treatment. Preferably, at least a portion of the free liquid is separated from the soaked lignocellulosic feedstock. Optionally, also a portion of the capillary liquid of the soaked ligno-cellulosic feedstock may be separated. The liquid removed contain compounds detrimental for downstream process steps and therefore are preferably withdrawn from the process.

The disclosed mild hydrothermal treatment thereby provide a preferred slurry of the lignocellulosic feedstock, comprising a free liquid and a treated ligno-cellulosic biomass.

The slurry of the lignocellulosic feedstock is then subjected to a sequential liquid removal process comprising many steps.

First, at least a portion of the free liquid is removed by draining under the action of gravity. The draining step produces a drained ligno-cellulosic feedstock which comprises a capillary liquid. Even if it would be preferable that no free liquid would be present, optionally, a minor portion of free liquid may be allowed. Preferably, the percent amount of free liquid in the drained ligno-cellulosic feedstock is less 30%, more preferably less than 20%, even more preferably less than 10% and most preferably less than 5% by weight of the drained ligno-cellulosic feedstock by weight on wet basis.

The draining of the free liquid is preferably conducted in a continuous mode or in a batch mode, in one or more steps, for instance by means of a conveyor belt, a vertical drainer, an inclined drainer, a decanter, or a combination thereof.

In one embodiment, at least a portion of the free liquid is drained while removing the soaked ligno-cellulosic feedstock from the soaking vessel. Preferably, the soaked ligno-cellulosic feedstock is conveyed from an outlet of the soaking vessel on an inclined belt conveyor, having means for withdrawn the drained liquid.

In another embodiment at least a portion of the free liquid is drained on a horizontal belt conveyor connected to, or integrated in at least one downstream device. The drained liquid may be removed by means of holes distributed on the belt.

The draining by gravity may occur at atmospheric pressure or at a pressure greater than 100 kPa. Preferably, the pressure in the draining zone is less than or equal to the pressure of the upstream process step of providing the slurry.

The drained ligno-cellulosic feedstock is then subjected to at least two steps to remove a relevant portion of the capillary liquid. The first portion of the capillary liquid is relatively easy to be removed from the drained ligno-cellulosic feedstock, thereby a low intensity mechanical action may remove a relevant amount of capillary liquid. To remove further capillary liquid, the intensity of the mechanical action must increase significantly and progressively the amount of removed liquid decreases. According to the disclosed process, the removal of a first portion of the capillary liquid occurs by compressing a stream of the drained ligno-cellulosic feedstock to produce a dewatered ligno-cellulosic feedstock stream, followed by the removal of a second portion of the capillary liquid by means of compression and shear in a plug forming device. Inventors have found that compression has to act on a stream of the drained ligno-cellulosic feedstock, in order to avoid accumulation of incompressible liquids. Liquid accumulation would prevent further liquid removal, or would require one to increase the compression intensity. Moreover, the compression should be preferably distributed on a wide compression surface, in order to reduce the flux of the removed liquid, expresses as amount of liquid per unit surface per unit time, to prevent liquid accumulation.

Thereby, the removal of the first portion of capillary liquid occurs in a low pressure zone, as the removal of a large amount of liquid would be difficult to be operated on industrial scale if the removal would occur in a high pressure zone. Preferably the low pressure zone is at atmospheric pressure. In certain cases, the low pressure zone may pressurized at a pressure greater than 100 kPa and less 600 kPa, preferably less than 400 kPa, and most preferably less than 200 kPA.

Preferably, the pressure in the low pressure zone is less than or equal to the pressure of the upstream process steps, which comprises the process to provide the slurry of the ligno-cellulosic feedstock and the draining by gravity of at least a portion of the free liquid.

The removal of the second portion of the capillary liquid occurs under the action of compression and shear forces, whose intensity is typically greater than the compression forces of compression step, in a plug forming device. Suitable plug forming devices are known in the art as screw compressors, worm compressors or similar devices. The plug forming device receives the dewatered ligno-cellulosic stream from an inlet of plug forming device which is or is connected to the low pressure zone, conveys the feedstock through an internal chamber to an outlet of the plug forming device by means of at least one screw rotating around its main axis located in the internal chamber, and having a profile designed to impress compression and shear to the feedstock. The outlet of the plug forming device is or is connected to a high pressure zone. Liquid removal occurs while conveying the lignocellulosic feedstock to the outlet of the plug forming device, wherein the feedstock forms a compact plug capable to seal the zones at different pressure.

Removed liquid is withdrawn by means of screen filters, which are preferably disposed coaxially to the rotation axis of the screw, adjacent to the internal chamber. Thereby, there exists in the plug forming device a flow region, which is typically inside the internal chamber of the plug flow device, wherein the ligno-cellulosic feedstock is allowed to flow from the low pressure zone to the high pressure zone. The flow region has a volume which is the accessible volume of the plug forming device.

Inventors have discovered that to effectively operate the whole process of capillary liquid removal at a high flow rate, it is necessary that the dewatered ligno-cellulosic feedstock stream produced by the first compression step must have a moisture content in a specific first target range. Depending also on the specific ligno-cellulosic feedstock processed, the moisture content may be from 65% to 85%, preferably from 70% to 80%, and most preferably from 75% to 78% by weight on a wet basis.

For the process being operated continuously preventing pressure losses and liquid accumulation in the plug forming device, it is necessary that the moisture content of ligno-cellulosic feedstock plug, that is the feedstock at the outlet of the compression at the outlet of the plug forming device, is in a second target range, which is preferably narrow. Thereby, the feedstock plug has preferably a moisture content in a range from 40% to 60%, more preferably from 45% to 50%, and most preferably from 47% to 53% by weight on a wet basis.

Thereby, a stream of the drained ligno-cellulosic feedstock, which may be accumulated in a storage bin, is first provided. The stream of the drained ligno-cellulosic feedstock is characterized by its flow rate, which is the amount of ligno-cellulosic feedstock on a dry basis entering the compression step per unit time.

The stream of the drained ligno-cellulosic feedstock is compressed by at a compression ratio in the range of greater than 1:1 to 12:1, wherein the compression ratio is the geometrical compression rate of the compression device used. Preferably the compression ratio is from 2:1 to 8:1, and most preferably from 2.5:1 to 5:1.

In one embodiment, the removal of the first portion of capillary liquid by compression comprises the use of at least one piston, moving in an internal chamber of a cylinder, and the stream of the ligno-cellulosic feedstock is divided in aliquots which are sequentially introduced into the cylinder and compressed by the piston. The removed liquid may be extracted from the cylinder by means of holes located on the cylinder. The compression ratio is the ratio of the volume filled by the feedstock when the piston enters in contact with the feedstock to the volume of the feedstock at the end of compression, before compression is released. Namely, after compression is released, the ligno-cellulosic feedstock may relax internal stressed accumulated during compression, increasing to a certain extent its volume.

In another preferred embodiment, the removal of the first portion of capillary liquid by compression comprises the use of at least one belt filter press. The belt filter press is an apparatus used in food and pulping industry to dewatering, or thickening, very diluted organic solid suspensions and sludge. In the disclosed belt filter press, two closed-loop belts are coupled to define a compression region having an inlet of the compression region, wherein the incoming stream drained feedstock is introduced, and an outlet of the compression region, wherein the dewatered feedstock stream is removed. The belts are moved by respective driving means for circulating the upper and lower belt filters in a chosen direction. In operating conditions, the belts have a common moving direction in the compression region. It is preferable that the belts move at the same velocity, so that the liquid removal occurs by compression forces. It is believed that shear forces, if present, have a negligible effect on liquid removal, while they may promote the movement of the feedstock in a flowing direction which is parallel to the moving direction of the belts, preventing thereby feedstock accumulation at the inlet of the compression region. Preferably, the moving direction of the belts in the compression region is horizontal with respect to gravity, but the moving direction may also form an angle with respect to an horizontal plane which is less than 60°, preferably less than 30°, most preferably less than 10°.

Thereby, it is possible to define an upper belt and a lower belt with respect to gravity. At least one on the belts is perforated to promote the withdrawn of removed liquids from the compression region. In a preferred embodiment, at least the lower belt presents distributed holes, which are shaped to limit feedstock losses simultaneously avoiding plugging. The belts may be realized by means of composite materials, and may comprise plastic material, such as polyethylene or polypropylene, rubber, or mixture thereof. Preferably the belts are modular, being composed by rigid modules connected together to form the closed-loop belts. Adjacent modules are preferably connected together in a not rigid way, so that they can rotate respectively around a joint rotation axis.

The belt filter press may comprise a plurality of guide rolls connected to the belts to promote the movement of the belts in the compression region. At least some of the guide roles may be configured to form a rigid mechanical constrain for the belts. Thereby, in an embodiment, the compression region may have a fixed profile in the moving direction, that is the longitudinal section of the compression region does not modify over time. The profile of the compression region has preferably a convergent profile to progressively remove liquids, so that the liquid removal is distributed along the compression region, thereby limiting the local flux of the removed liquid to prevent liquid accumulation. The liquid removed are preferably collected by gravity in a liquid collector located below the compression region with respect to gravity.

In a preferred embodiment, a portion of the lower belt extend from the inlet of the compression zone in the opposite direction of the moving direction to define a receiving zone for receiving the incoming ligno-cellulosic stream of the drained ligno-cellulosic feedstock. A remnant portion of the free liquid contained in the incoming stream may therefore be drained by gravity while being conveyed to the compression region by the perforated bottom belt. In another preferred embodiment, the slurry of the ligno-cellulosic feedstock is received as a stream on the perforated bottom belt and the draining of at least a portion of the free liquid occurs on the perforated bottom belt. Thereby, the belt filter press may integrate both the draining and the compression steps.

The belt filter press may further comprise means to distribute the incoming ligno-cellulosic stream on the bottom belt in a direction transversal to the moving direction of belts and to equalize the thickness of the lignocellulosic feedstock stream entering the compression zone. These means may comprise static constrains such as barriers. Preferably, a distribution screw rotating around an axis transversal to the moving direction of belts is used. The axis is located at a suitable distance from the bottom belt to define an opening between the screw and the bottom belt.

The compression ratio is the ratio of the distance between the belts in the position wherein the incoming stream enters in contact with the upper belt to the minimum distance of the belts during compression. The distance is measured in a direction perpendicular to the moving direction of the belts in the compression region.

The belt filter press is operated in the first pressure zone, preferably at atmospheric pressure. In some embodiments, the belt filter press may be enclosed in a sealed container which may have an internal pressure greater than 100 kPa. In this configuration, sealed connections are provided to withdrawn the removed liquids from the first pressure zone.

As the stream of the drained ligno-cellulosic feedstock come from the slurrying step, which is usually conducted at a temperature less than 160° C., but may be conducted at a temperature greater than 160° C., the compression step is preferably conducted on a hot ligno-cellulosic feedstock stream, as the high temperature promotes liquid removal. Thereby, the temperature of the drained ligno-cellulosic feedstock during compression may be from 10° C. to 160° C., preferably from 50° C. to 100° C., and most preferably from 60° C. to 90° C.

Inventors have discovered that maintaining the time-stability of the moisture of the dewatered ligno-cellulosic feedstock stream at the inlet of the plug forming device is essential to prevent plug losses and consequently pressure drops. Namely, it is sufficient that the aliquot of dewatered ligno-cellulosic feedstock present at a certain instant in the plug forming device is outside the first target range of moisture content to dramatically increase the risk of plug failure. Thereby, in order to consider the dewatered ligno-cellulosic feedstock stream time stable, inventors have discovered the stringent requirement that the mean moisture content of any aliquot of the dewatered ligno-cellulosic feedstock having a aliquot volume comparable to the accessible volume of the plug forming device must be in the first target range. The aliquot volume may be less than four times the accessible volume of the plug forming device, preferably less than 2 times the accessible volume of the plug forming device, preferably less than the accessible volume of the plug forming device.

On the other hand, it is not necessary to preserve the time-stability of the moisture content of the dewatered ligno-cellulosic feedstock stream over an infinitesimally small aliquot volume, as fluctuations of the moisture may be compensate in the plug forming device to a certain extent, provided that the mean moisture content of the dewatered ligno-cellulosic feedstock stream is in the first target range on a aliquot volume which is at least 10% the accessible volume of the plug forming device, preferably at least 20% the accessible volume of the plug forming device, more preferably at least 50% the accessible volume of the plug forming device, and most preferably at least 80% the accessible volume of the plug forming device.

The stability over time of the moisture content of the dewatered ligno-cellulosic feedstock stream will be affected in particular by the flow of the drained ligno-cellulosic feedstock entering the compression step, which is the amount of drained ligno-cellulosic feedstock on a dry basis entering the compression step per time unit. In certain cases, the flow of the drained ligno-cellulosic feedstock will vary over time because it is difficult to introduce continuously a constant volume of ligno-cellulosic feedstock into the compression device, especially when the process is conducted at high flow rate. In other cases, the moisture content of the drained ligno-cellulosic feedstock stream is not uniform, or not constant.

As the fluctuations of the drained ligno-cellulosic feedstock flow cannot be controlled continuously, in a preferred embodiment the stream of the drained ligno-cellulosic feedstock is continuously compressed to at least one control pressure to reach the required time stability of the moisture content of the dewatered ligno-cellulosic feedstock stream at the inlet of the plug forming device. Thereby, the compression device does reduce the moisture content of the stream of the drained ligno-cellulosic feedstock to a value in the first target range even if it is fed with a stream of the drained ligno-cellulosic feedstock having a moisture content variable in a wide range, the compression being exerted till the applied pressure reaches the control pressure, and corresponding to a compression ratio in the range of greater than 1:1 to 12:1, preferably from 2:1 to 8:1, and most preferably from 2.5:1 to 5:1. Namely, without being limited by any interpretation, by exerting a fixed pressure on a feedstock stream having in general a variable flow, a uniform moisture content can be reached, corresponding to a variable amount of removed liquids. The control pressure may be changed or tuned over time while conducting the disclosed continuous process, to take into account variations of the upstream process conditions. Thereby, in a preferred embodiment, the further feature of equalizing the moisture content of the dewatered ligno-cellulosic feedstock is obtained. The control pressure may be in a range of from 100 kPa to 10,000 kPa, preferably from 200 kPa and 9,000 kPa, and most preferably from 500 kPa to 8,000 kPa.

In one embodiment, the removal of the first portion of capillary liquid by compression comprises the use of at least one piston which compresses continuously the aliquot of the feedstock introduced into the piston chamber to at least one control pressure. The piston may progressively compress the feedstock in the piston chamber to more than one control pressure In a preferred embodiment, the removal of the first portion of capillary liquid by compression comprises the use of a belt filter press and at least one first compression device continuously compresses the stream of the drained ligno-cellulosic feedstock the control pressure, while conveying the stream of the drained ligno-cellulosic feedstock in the flow direction of the belt filter press. The compression at a control pressure is preferably exerted in a direction which is perpendicular to the flow direction in the position wherein the control pressure is exerted, even if a certain inclination may be allowed. Preferably, there are many compression devices distributed along the flow direction, each having a specific control pressure. More preferably, the control pressure of the compression devices increases along the flowing direction to obtain a liquid removal distributed along the compression region of the belt filter. The compression may thereby be exerted along the whole compression region by the belts, wherein the pressure at the positions of the compression devices is maintained at the constant pressure of each compression device. The compression region may have thereby a time variable profile to equalize the moisture content of the feedstock at the outlet of the belt filter.

The compression device may be a spring, eventually preloaded to exert the control pressure. Preferably, the compression device is a piston and the control pressure may be easily controlled by controlling the hydraulic pressure of the piston.

The compression devices are located at fixed positions of the compression region and may exert the control pressure directly on at least one belt, preferably on the upper belt, or indirectly through mechanical means. The belt or belts will transmit the applied control pressure to the feedstock. In a preferred embodiment, the compression devices are connected to a plurality of guide rolls, which are then connected to the belts to promote the movement of the belts.

The dewatered feedstock stream, having a uniform moisture content, is then introduced into the plug forming device connected to the high pressure zone. The plug forming device has a compression ratio which may be in a range from greater than 1:1 to 8:1, preferably from 1.1:1 to 5:1, more preferably from 1.5:1 to 3:1, and most preferably from 1.5:1 to 2.5:1. The compression ratio of a plug forming device is a standard parameter defined according to well-known engineering methods. It may be expressed as the ratio of the volume occupied by the feedstock at the inlet of the device to the volume occupied by the compressed feedstock at the outlet of the device, in absence of hysteretic behavior of the feedstock.

The pressure of the high pressure zone is preferably in a range greater than 600 kPa to 4,000 kPa, more preferably from 1,000 kPa to 2,600 kPa, and most preferably from 1,200 kPa to 2,000 kPa.

The feedstock plug at the outlet of the plug forming device is then forced to enter continuously into the high pressure zone by the feedstock which is advancing in the plug forming device. In a preferred embodiment the high pressure zone is a high pressure reactor, wherein the feedstock is subjected to a hydrothermal treatment at severe conditions, to produce a pretreated ligno-cellulosic feedstock. The pretreated feedstock has an increased accessibility to biological or chemical agents, such as enzymes or mineral acids, in comparison with the starting feedstock. In another embodiment, the high pressure zone is connected to the high pressure reactor, which may be at a pressure greater than the high pressure zone, and the feedstock is further conveyed to the high pressure reactor. The feedstock plug is preferably fragmented under the action of gravity force or by mechanical means to increase the surface exposed to water.

The severe hydrothermal treatment is conducted at a the hydrothermal temperature which may be from 170° C. to 230° C., and preferably from 180° C. to 210° C. for a hydrothermal time which may be from 30 seconds to 1 hour, preferably from 30 seconds to 30 minutes and most preferably from 1 minute to 10 minutes. The hydrothermal treatment is conducted in the presence of water in liquid or steam form, or a mixture thereof. Water may be added as pressurized liquid water. Preferably, steam is used, it is preferably saturated, but could be superheated. The hydrothermal treatment can be batch or continuous, with or without stirring. Preferably, the hydrothermal treatment is conducted continuously, wherein the pretreated ligno-cellulosic feedstock is removed in a continuous way from an outlet of the high pressure reactor.

In a most preferred embodiment, the pre-treated ligno-cellulosic feedstock is further subject to steam explosion by rapidly releasing the pressure applied to the feedstock at the outlet of the high pressure reactor. Steam explosion is a well known technique in the biomass field and any of the systems available today and in the future are believed suitable for this step. The severity of the steam explosion is known in the literature as Ro, and is a function of time and temperature and is expressed as $Ro = t \times \exp[(T-100)/14.75]$, with temperature, T expressed in Celsius and time, t, expressed in minutes. The formula is also expressed as $Log(Ro)$, namely $Log(Ro) = Ln(t) + [(T-100)/14.75]$. $Log(Ro)$ is preferably in the ranges of 2.8 to 5.3, 3 to 5.3, 3 to 5.0 and 3 to 4.3.

The invention claimed is:

1. A continuous pretreatment of a ligno-cellulosic feedstock having a starting liquid retention capability and a starting moisture content which is less than a first target range, the process comprising the steps of:

a. providing a slurry of the ligno-cellulosic feedstock;
b. draining by gravity at least a portion of a free liquid of the slurry to produce a drained ligno-cellulosic feedstock containing a capillary liquid;
c. removing a first portion of the capillary liquid in a low pressure zone operating at atmospheric pressure by compressing a stream of the drained ligno-cellulosic feedstock at a compression ratio in a range of greater than 1:1 to 12:1, to produce a dewatered ligno-cellulosic feedstock stream having a moisture content in the first target range which is from 65% to 85%;
d. removing a second portion of the capillary liquid from the dewatered ligno-cellulosic feedstock stream by shearing and compressing the dewatered ligno-cellulosic feedstock stream in a plug forming device, to form and advance a ligno-cellulosic feedstock plug into a high pressure reactor operating in the range of greater than 600 kPa to 4,000 kPa connected to an outlet of the plug forming device plug;
e. subjecting the ligno-cellulosic feedstock to a hydrothermal treatment in the presence of water in liquid or steam phase or a mixture thereof at a hydrothermal temperature in the range of 160° C. to 250° C. for a hydrothermal time in the range of 10 sec. to 2 hour to produce a pretreated lignocellulosic feedstock.

2. The process of claim 1, wherein the process further comprises steam exploding the pretreated lignocellulosic feedstock.

3. The process of claim 1, wherein providing the slurry of the ligno-cellulosic feedstock comprises the step of treating the ligno-cellulosic feedstock treatment in the presence of water in liquid or steam phase at a temperature between 60° C. and 160° C., and for a time sufficient to create a slurry comprising a free liquid and a treated ligno-cellulosic feedstock, wherein the treated ligno-cellulosic feedstock has a liquid retention capability which is greater than the starting liquid retention capability.

4. The process of claim 3, wherein the treatment of the ligno-cellulosic feedstock is conducted for a time which is in a range selected from the group consisting of 5 minutes to 3 hours.

5. The process of claim 3, wherein the lignocellulosic feedstock comprises carbohydrates and the percent amount of carbohydrates solubilized in the thermal treatment is less than 10 by weight.

6. The process of claim 1, wherein providing the slurry of the ligno-cellulosic feedstock comprises the step of soaking the ligno-cellulosic feedstock in a soaking liquid comprising water a soaking temperature between 30° C. and 100° C., and for a soaking time sufficient to create a slurry comprising a free liquid and a soaked ligno-cellulosic feedstock without altering the starting liquid retention capability, wherein the soaked ligno-cellulosic feedstock has a moisture content which is greater than 80% of the starting liquid retention capability.

7. The process of claim 6, wherein the ligno-cellulosic feedstock comprises a ligno-cellulosic component and non-ligno-cellulosic water soluble compounds, and the free liquid comprises water and water soluble species derived from the non ligno-cellulosic water soluble compounds.

8. The process of claim 6, wherein the soaking temperature is in a range selected from the group consisting of 40° C. to 99° C.

9. The process of claim 6, wherein the soaking time is in a range selected from the group consisting of 30 seconds to 300 minutes.

10. The process of claim 1, wherein the stream of the drained ligno-cellulosic feedstock is continuously compressed to at least one control pressure.

11. The process of claim 10, wherein at least one first compression device continuously compresses the stream of the drained ligno-cellulosic feedstock to a first control pressure, while conveying the stream of the drained ligno-cellulosic feedstock in a flow direction of a belt filter press.

12. The process of claim 10, wherein the first control pressure is a value in a range of 100 kPa to 10,000 kPa.

13. The process of claim 10, wherein there are more than one compression devices distributed along the flow direction, each having a control pressure.

14. The process of claim 13, wherein the control pressure of the compression devices increases along the flowing direction.

15. The process of claim 1, wherein the first target range is from 70% to 80.

16. The process of claim 1, wherein the hydrothermal temperature of step f) is a value in a from 170° C. to 230° C.

17. The process of claim 1, wherein the hydrothermal time of step f) is a value in a range consisting of from 30 seconds to 1 hour.

18. The process of claim 1, wherein the ligno-cellulosic feedstock is a straw.

19. The process of claim 1, wherein the ligno-cellulosic feedstock is selected from the group consisting of wheat straw, rice straw, barley straw, and bagasse.

* * * * *